(12) United States Patent
Wengerd

(10) Patent No.: US 10,765,185 B1
(45) Date of Patent: Sep. 8, 2020

(54) UMBRELLA HOLDER

(71) Applicant: Tim Wengerd, New York, NY (US)

(72) Inventor: Tim Wengerd, New York, NY (US)

( * ) Notice: Subject to any disclaimer, the term of this patent is extended or adjusted under 35 U.S.C. 154(b) by 0 days.

(21) Appl. No.: 16/367,797

(22) Filed: Mar. 28, 2019

(51) Int. Cl.
*A45B 11/00* (2006.01)
*F16B 2/10* (2006.01)
*B62B 9/14* (2006.01)
*F16B 2/18* (2006.01)

(52) U.S. Cl.
CPC ............... *A45B 11/00* (2013.01); *F16B 2/10* (2013.01); *F16B 2/185* (2013.01); *B62B 9/147* (2013.01)

(58) Field of Classification Search
CPC . A45B 11/00; F16B 2/10; F16B 2/185; B62B 9/147
See application file for complete search history.

(56) References Cited

U.S. PATENT DOCUMENTS

| | | | | |
|---|---|---|---|---|
| 3,155,353 A | * | 11/1964 | Small | A45B 11/00 248/515 |
| 3,304,036 A | * | 2/1967 | Davis | A63B 55/60 248/514 |
| 3,848,838 A | * | 11/1974 | Thomas | A47C 7/66 248/541 |
| 5,836,327 A | * | 11/1998 | Davis | A45B 11/00 135/16 |
| 6,568,644 B2 | * | 5/2003 | Pedersen | B62J 7/08 224/309 |
| 8,146,879 B2 | * | 4/2012 | Liao | A45B 11/00 248/514 |
| 2015/0286115 A1 | * | 10/2015 | Koch | F16M 13/00 248/615 |

* cited by examiner

*Primary Examiner* — Anita M King
(74) *Attorney, Agent, or Firm* — Richard E. Oney; Venjuris, P.C.

(57) ABSTRACT

An umbrella mounting device includes a clamp assembly configured to be removably clamped to an elongated support member and an umbrella holder coupled to the clamp assembly so that the umbrella holder is rotatable about a longitudinal rotation axis that is generally perpendicular to the clamp assembly axis. A longitudinal rotation locking mechanism includes a threaded handwheel to secure the umbrella holder in the longitudinal rotation axis at an angular position that is selectable from a plurality of angular positions about the longitudinal rotation axis. The umbrella holder also is rotatable to one of a plurality of selectable positions about a transverse rotation axis. A transverse locking mechanism secures the umbrella holder into one of the plurality of selectable positions about the transverse rotation axis. The clamping assembly includes a quick locking and quick release lever.

14 Claims, 9 Drawing Sheets

UMBRELLA HOLDER

BACKGROUND

The present invention relates generally to an adjustable mounting device for securing an umbrella to an elongated support member, such as a tubular member of a baby stroller. More specifically, the invention relates to an umbrella mounting device that can relatively quickly and easily be mounted to and removed from the support member, that can be securely mounted to support members of different sizes, and that can be quickly and easily adjusted to position the umbrella at different angles on the support member.

It is an object of the present invention to provide such an umbrella mounting device.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objectives, and in accordance with the purposes of the invention as embodied and broadly described in this document, there is provided an umbrella mounting device for removably mounting an umbrella to an elongated support member, such as a tubular member of a stroller. The assembly comprises a clamp assembly configured to be removably clamped to the support member, a an umbrella holder configured to receive an umbrella handle, a longitudinal rotation locking mechanism configured to secure the umbrella holder in a longitudinal rotation axis at an angular position that is selectable from a plurality of angular positions about the longitudinal rotation axis; and a transverse locking mechanism configured to secure the umbrella holder into one of the plurality of selectable positions about a transverse rotation axis. The clamp assembly includes an outwardly facing mounting surface that is disposed generally parallel to a clamp assembly axis, which is generally perpendicular to the longitudinal rotation axis. The umbrella holder is rotatably coupled to the clamp assembly mounting surface so that the umbrella holder can be rotated about the longitudinal rotation axis. The umbrella holder also is rotatable to one of a plurality of selectable positions about the transverse rotation axis, which is generally parallel to the clamp assembly mounting surface and is generally perpendicular to the longitudinal rotation axis.

In some embodiments, the longitudinal rotation locking mechanism includes a longitudinal rotation locking member that is rotatably mounted on a threaded member disposed along the longitudinal rotation axis between the umbrella holder and the clamp assembly. In some embodiments, the longitudinal rotation locking member can comprise a threaded handwheel.

In some embodiments, the umbrella holder includes a portion that is rotatably mounted within a clevis on a clevis pin disposed along the transverse rotation axis. For example, the umbrella mounting device of claim can comprise a clevis including a yoke and an opposing shank, wherein the clevis yoke supports a clevis pin, the umbrella holder is mounted to the clevis pin and the clevis shank is rotatably coupled to the clamp assembly. The transverse rotation locking mechanism can include a transverse rotation locking member rotatably mounted on a threaded portion of the clevis pin and configured to tighten or loosen the clevis about the umbrella holder when the transverse rotation locking member is rotated. For example, he transverse rotation locking member can include a threaded handwheel.

In some embodiments, the clamp assembly includes a first clamp member, an opposing second clamp member, and a closure member configured to loosen and tighten the first and second clamp members. The first and second clamp members can be configured in a clamshell arrangement. In some embodiments, the clamp assembly includes a quick locking/release lever.

In one advantageous embodiment, the umbrella mounting device comprises a clamp assembly configured to be removably clamped to the elongated member, wherein the clamp assembly includes an outwardly facing mounting surface that is disposed generally parallel to the clamp assembly axis. An umbrella holder is coupled to the clamp assembly and is configured to receive an umbrella handle. The umbrella holder is rotatable about a longitudinal rotation axis that is generally perpendicular to the clamp assembly axis, and is also rotatable about a transverse rotation axis to one of a plurality of selectable positions, wherein the transverse rotation axis is generally parallel to the clamp assembly mounting surface and is generally perpendicular to the longitudinal rotation axis. A longitudinal rotation locking mechanism is configured to selectively secure the umbrella holder at an angular position about the longitudinal rotation axis that is selectable from a plurality of angular positions about the longitudinal rotation axis. The longitudinal rotation locking mechanism includes a longitudinal rotation locking member rotatably mounted on a threaded member that is disposed along the longitudinal rotation axis between the umbrella holder and the clamp assembly. A transverse rotation locking mechanism is configured to selectively secure the umbrella holder at an angular position about the transverse rotation axis that is selectable from a plurality of angular positions about the transverse rotation axis into one of the plurality of selectable positions about the transverse rotation axis.

In some embodiments, the umbrella mounting device includes a clevis that includes a yoke rotatably coupled to the clamp assembly and supporting a clevis pin. The umbrella holder includes a portion rotatably mounted on the clevis pin within the clevis yoke. The clevis pin is disposed along the transverse rotation axis, and the transverse rotation locking mechanism includes a locking member configured to tighten or loosen the clevis about the umbrella holder.

In other embodiments, the umbrella mounting device comprises a clamp assembly configured to be removably clamped to the elongated support member, a coupling member, and an umbrella holder, and a clamp assembly. The clamp assembly includes an outwardly facing mounting surface that is disposed generally parallel to a clamp assembly axis. The coupling assembly comprising a clevis including a shank coupled to the clamp assembly, an opposing yoke, and a pin supported within the yoke. The clevis shank includes a longitudinal threaded member disposed along a longitudinal rotation axis that is generally perpendicular to the clamp assembly axis, and the clevis shank is rotatable about the longitudinal rotation axis with respect to the clamp assembly. The clevis pin is disposed along a transverse rotation axis that is generally parallel to the clamp assembly mounting surface and is generally perpendicular to the longitudinal rotation axis. The umbrella holder is configured to receive an umbrella handle or shaft and is mounted on the clevis pin and is rotatable about the transverse rotation axis. A transverse rotation locking member is configured to tighten or loosen the clevis yoke about the umbrella holder and to secure the umbrella holder at an angular position about the transverse rotation axis that is selectable from a plurality of angular positions about the transverse rotation axis. A longitudinal rotation locking member mounted on the clevis longitudinal threaded member between the umbrella holder and the clamp assembly and movable along the longitudinal threaded member between a secured position wherein the longitudinal rotation locking member restricts rotation of the umbrella holder about the longitudinal threaded member and an unsecured position wherein the longitudinal rotation locking member allows longitudinal rotation of the umbrella holder about the longitudinal threaded member.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention.

DESCRIPTION

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon the invention.

It will be appreciated that terms such as "front," "forward," "rear," "rearward," "upper," "inner," "outer," "vertical," "horizontal," "bottom," "below," "top," "side," "inwardly," "outwardly," "downwardly" and "lower" and other positionally descriptive terms used in this specification are used merely for ease of description and refer to the orientation of the referenced components as shown in the figures. It should be understood that any orientation of the components described herein is within the scope of the present invention. The term "generally" as used in this specification is defined as "being in general but not necessarily exactly or wholly that which is specified." For example, "generally perpendicular" is used herein to indicate components that are in general, but not necessarily exactly or wholly, perpendicular.

Figure 1:
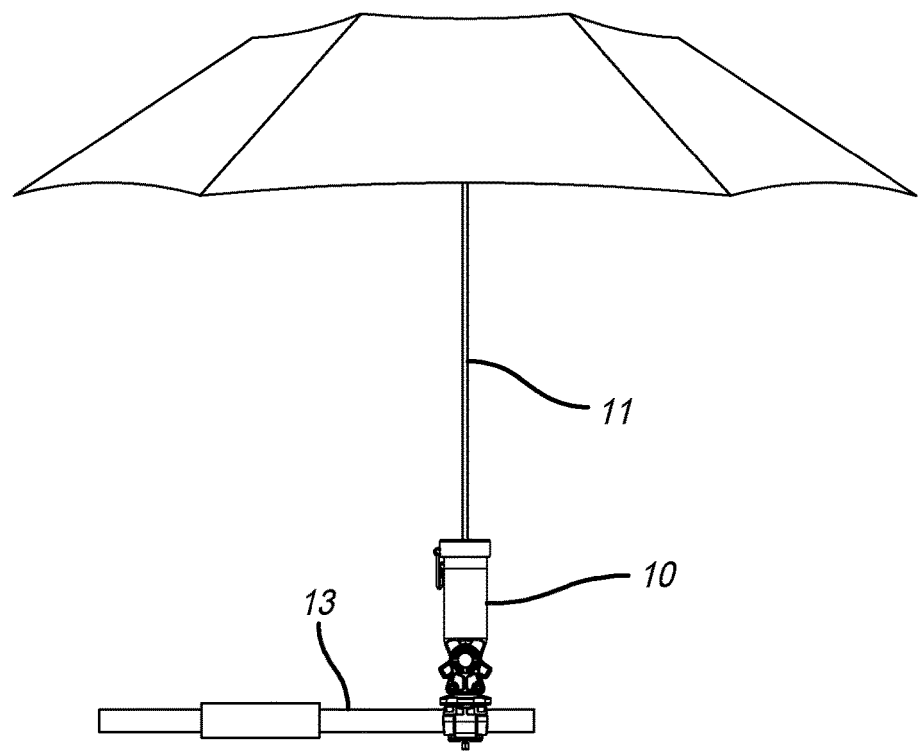
FIG. 1 is a side elevation view showing an umbrella mounted on a horizontal elongated support member using one embodiment of an umbrella mounting device according to the present invention, wherein the umbrella is positioned vertically with respect to the horizontal support member.
Figure 2:
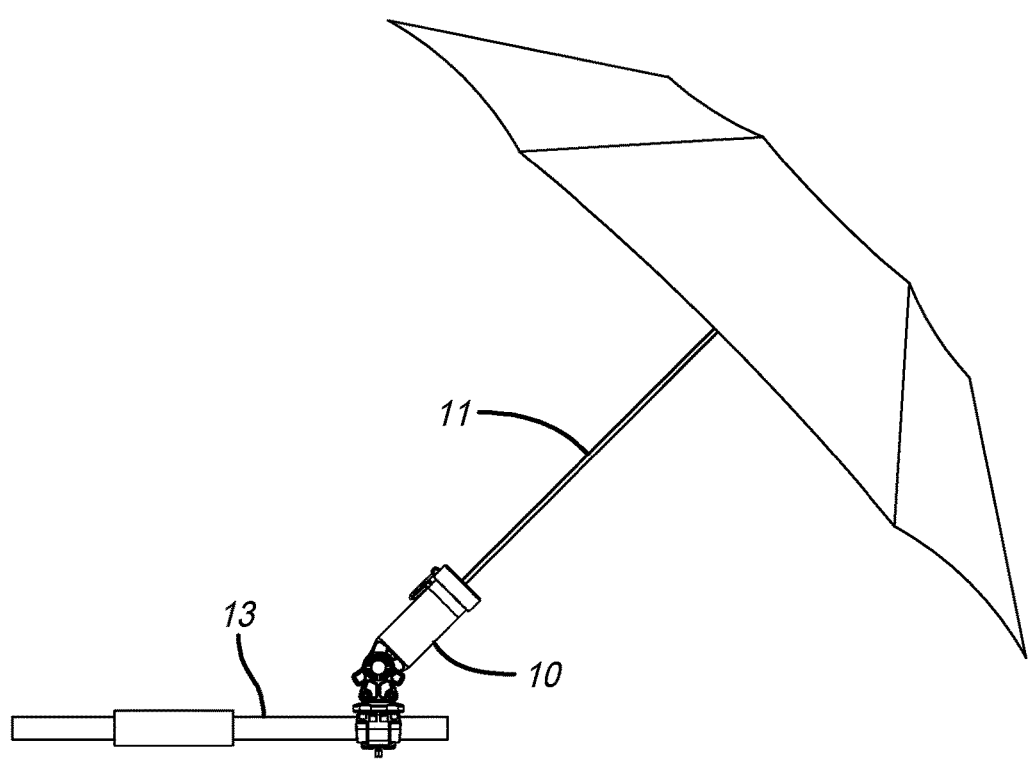
FIG. 2 is a side elevation view of the mounted umbrella of FIG. 1 showing the umbrella mounting device has been adjusted so that the umbrella is positioned at a different angle with respect to the horizontal support member.

As can be seen in FIGS. 1 and 2, an adjustable umbrella mounting device according to the present invention, generally designated with the reference numeral 10, can be used to for removably mounting an umbrella 11 to an elongated support member 13, such as a tubular member of a stroller baby carriage, wheelchair, or other suitable device, and for easily adjusting the angular position of the umbrella.

Figure 3:
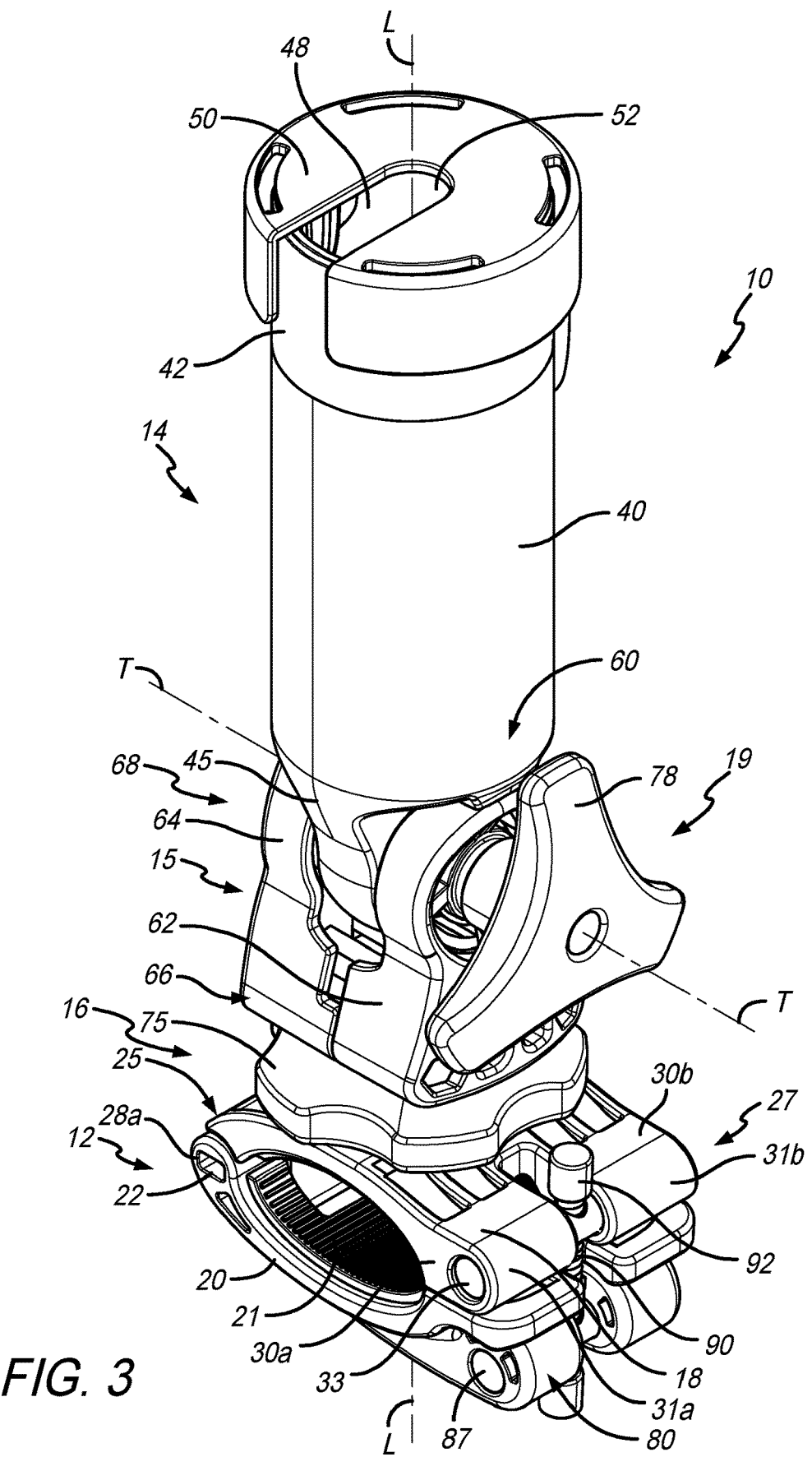
FIG. 3 is a perspective view of one embodiment of an umbrella mounting device according to the present invention.
Figure 4:
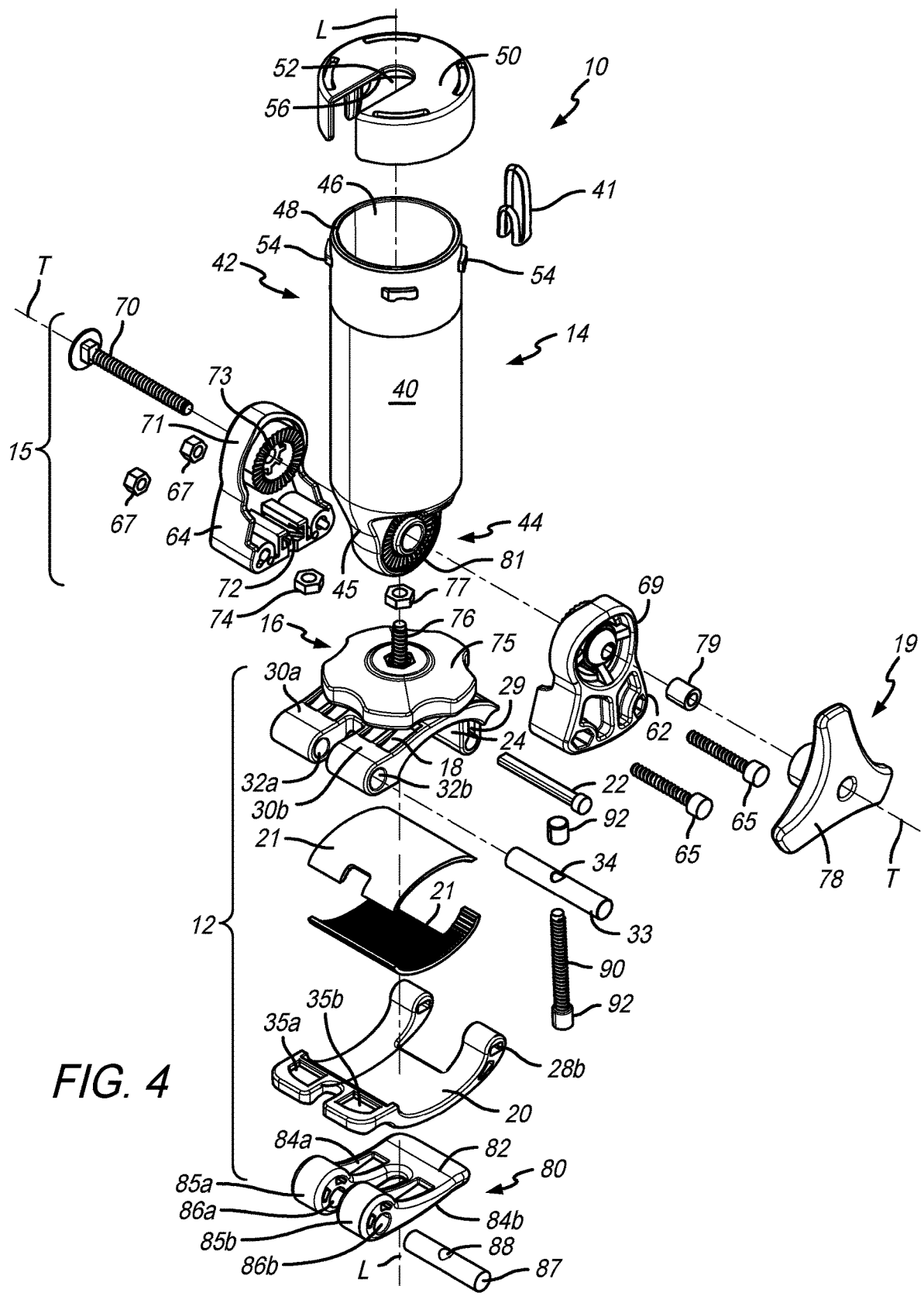
FIG. 4 is an exploded view of the umbrella mounting device shown in FIG. 3.

Referring to FIGS. 3-4, in one embodiment the umbrella mounting device 10, includes a clamp assembly 12 configured to be removably clamped to the support member 13 and an umbrella holder 14 configured to receive an umbrella handle. The umbrella holder 14 is coupled to the clamp assembly 12 via a coupler assembly 15 that allows the umbrella holder 14 to be rotated with respect to the clamp assembly 12 about a longitudinal rotation axis L through an angular range of 360 degrees. A longitudinal rotation locking mechanism 16 is configured to secure the umbrella holder 14 at any selected angular position within the 360 degree range of longitudinal rotation. The coupler assembly 15 also allows the umbrella holder 14 to be rotated about a transverse rotation axis T, which is generally perpendicular to the longitudinal rotation axis L. A transverse locking mechanism 19 is configured to secure the umbrella holder 14 into one of a plurality of selectable angular positions about the transverse rotation axis T. The transverse locking mechanism 19 can be released to allow the umbrella holder 14 to be rotated about the transverse rotation axis to one of a plurality of selectable positions and can then be locked to secure the umbrella holder in the selected position.

Clamp Assembly

Figure 5:
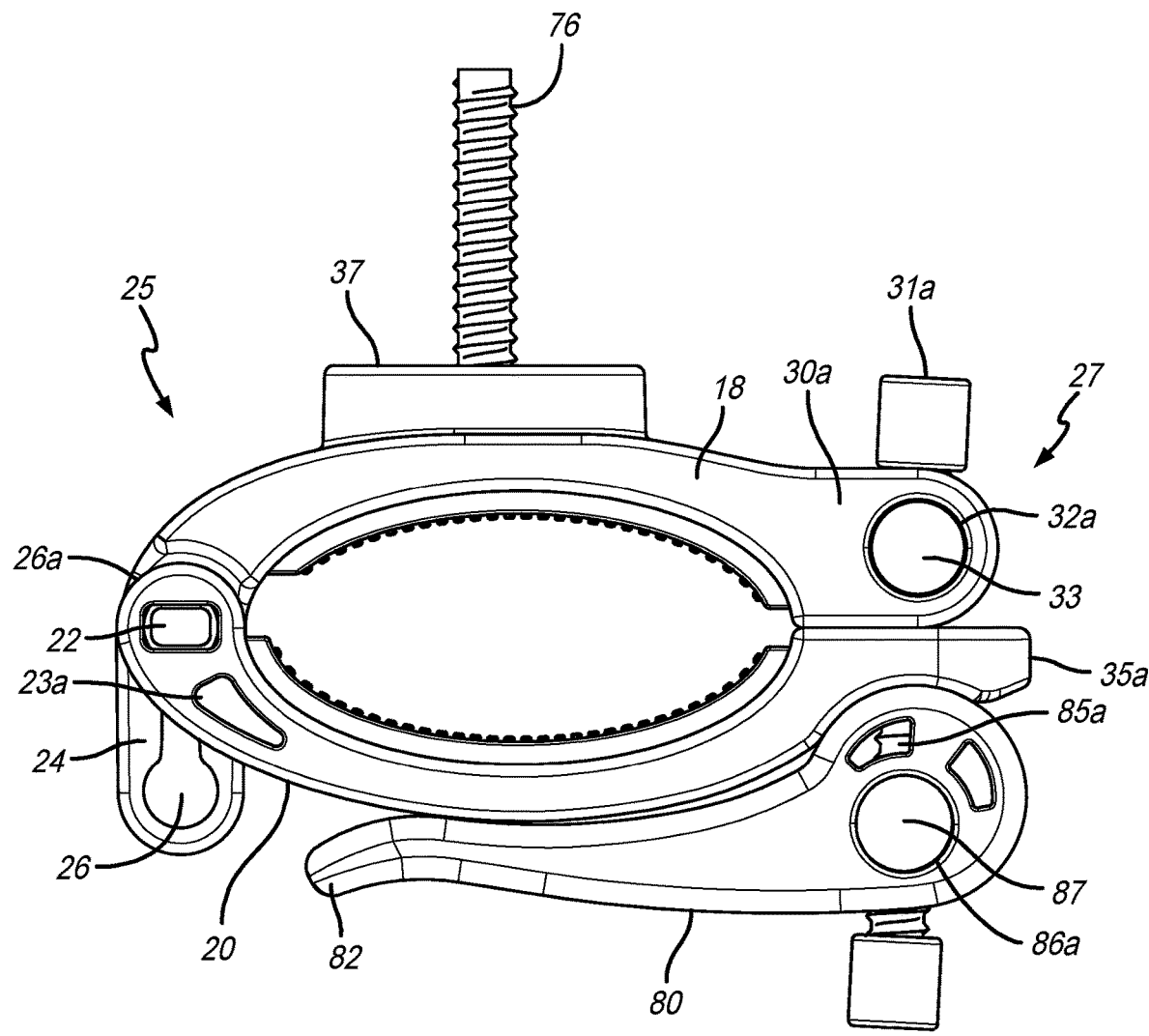
FIG. 5 is a side elevation view of the clamp assembly of the umbrella mounting device of FIG. 3 showing the clamp assembly in the fully closed position.
Figure 6:
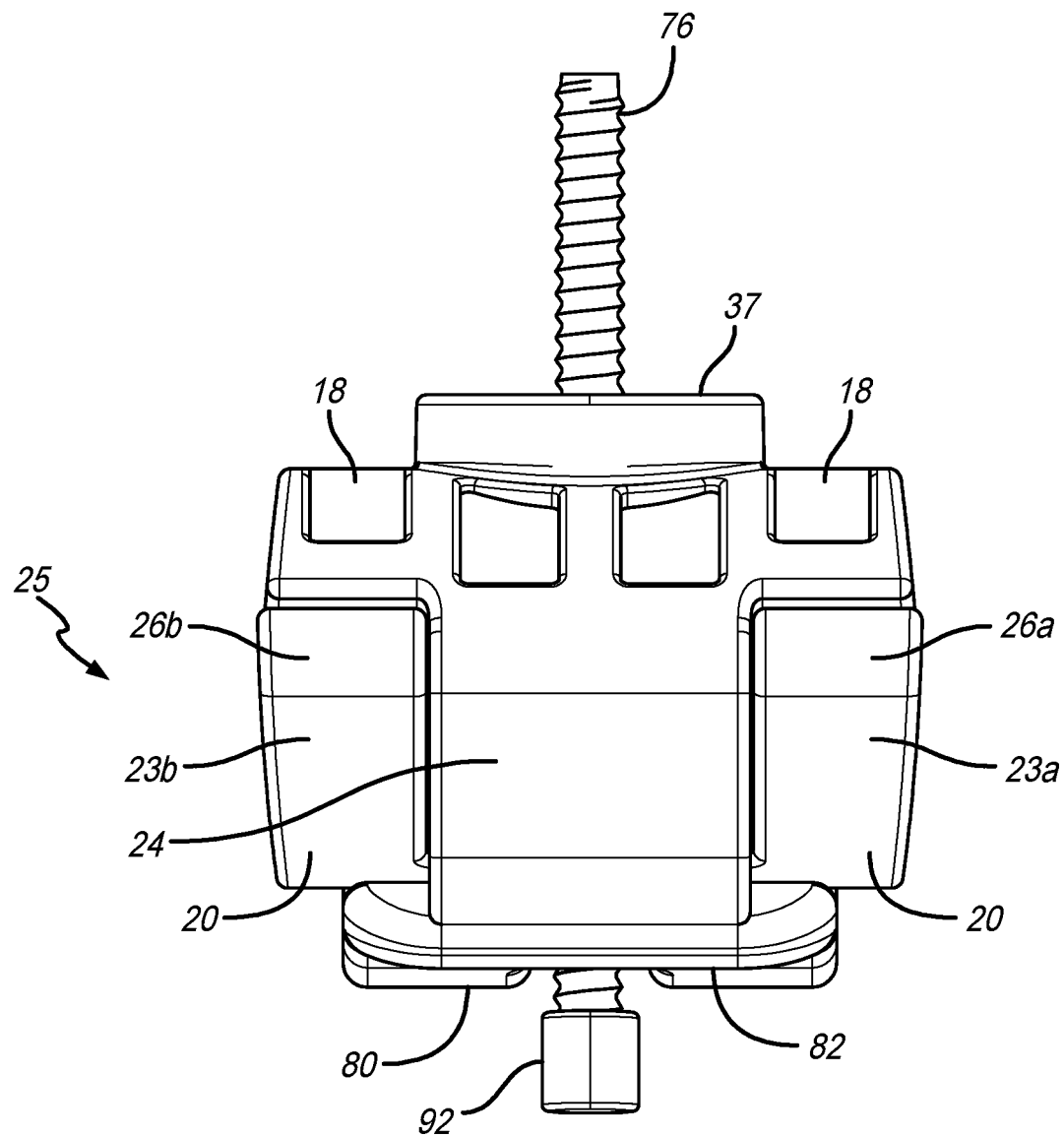
FIG. 6 is an end elevation view of the closed clamp assembly of FIG. 5 showing the hinged end of the clamp assembly.
Figure 7:
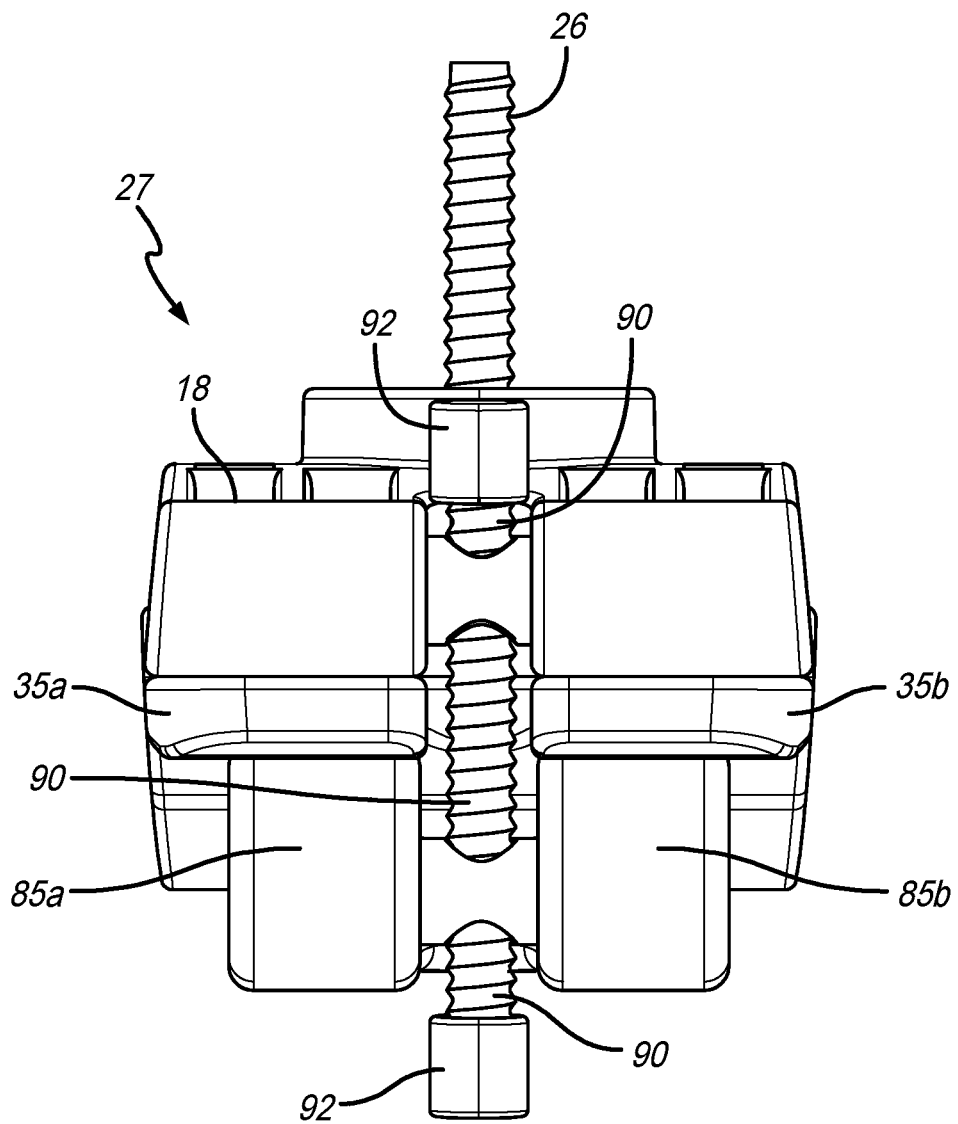
FIG. 7 is an end elevation view of the closed clamp assembly of FIG. 5 showing the non-hinged end of the clamp assembly.
Figure 8:
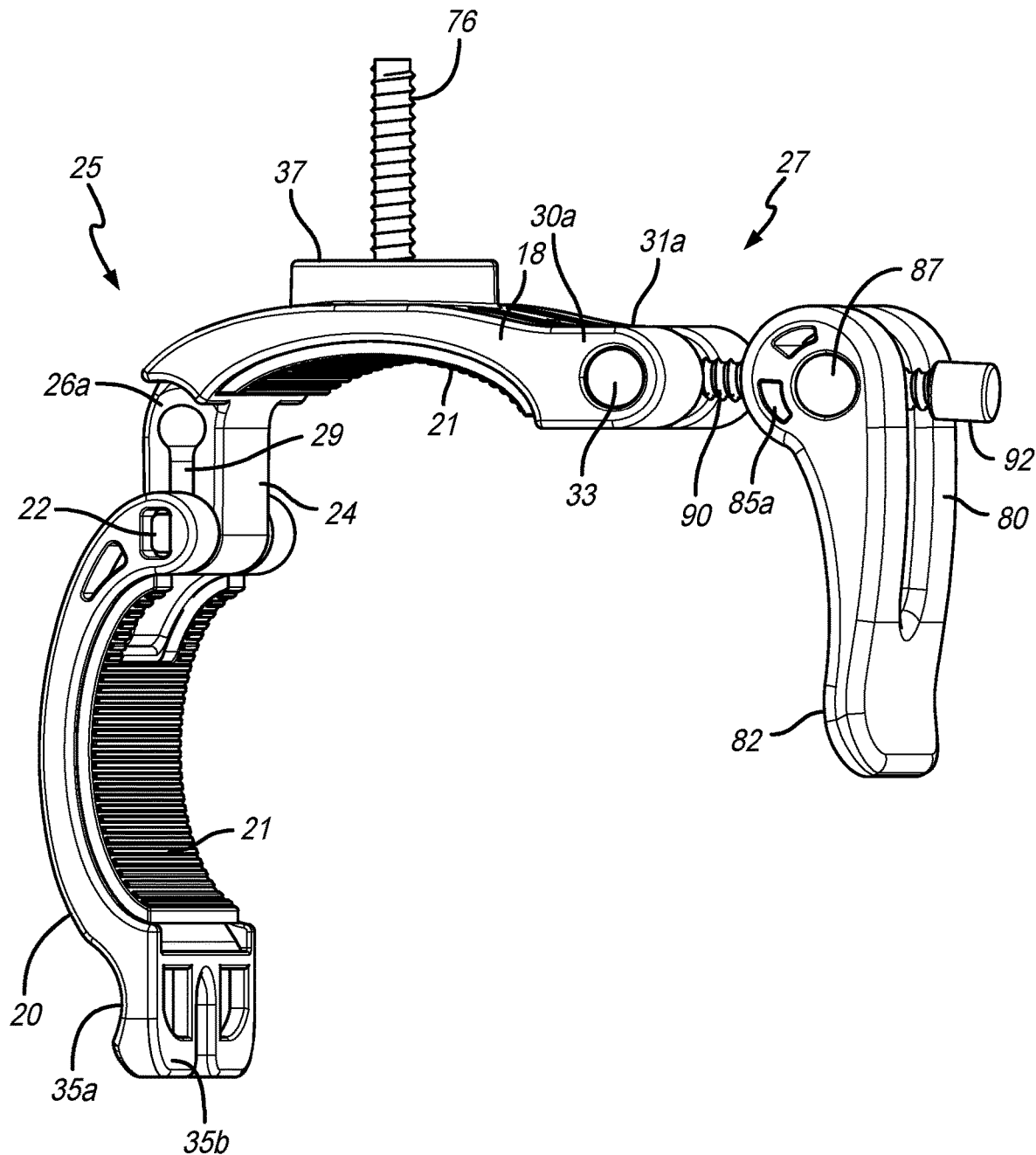
FIG. 8 is a side elevation view of the clamp assembly of FIG. 3 showing the clamp assembly in an open position.
Figure 9:
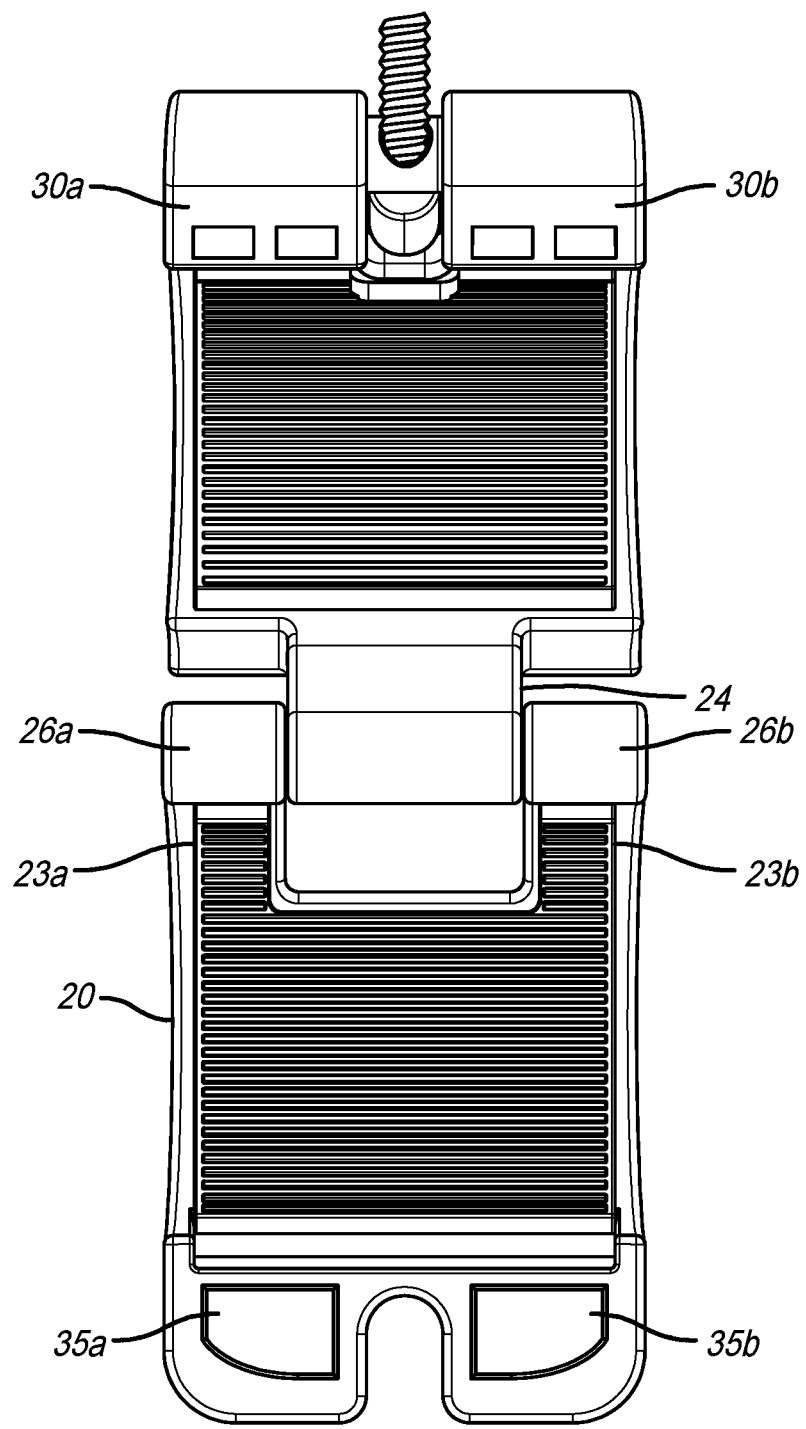
FIG. 9 is end elevation view of the open clamp assembly of FIG. 8 showing the non-hinged end of the clamp with the clamp locking member removed.
Figure 10:
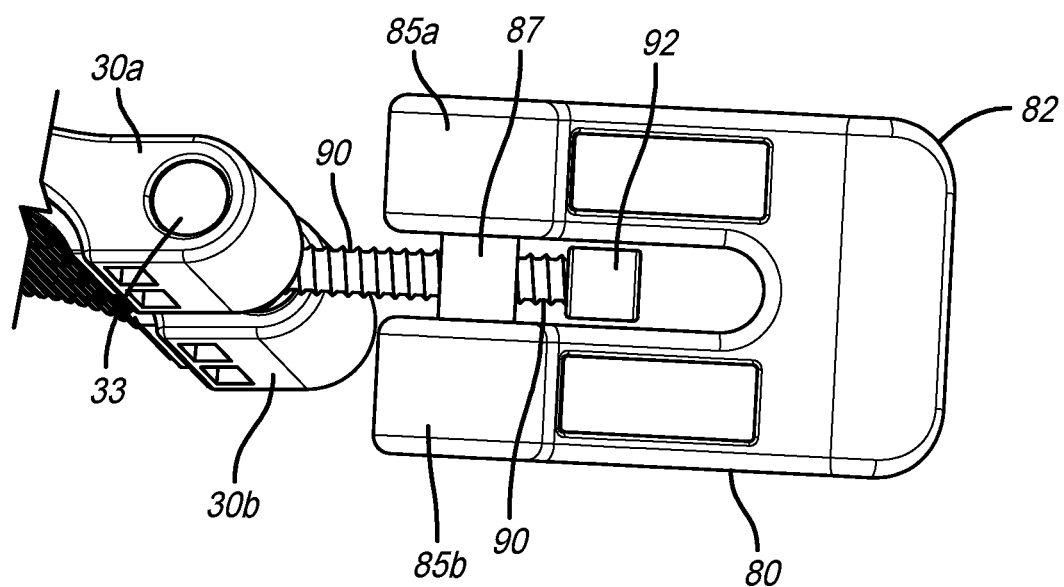
FIG. 10 is a top plan view of the clamp locking member of the clamp assembly of FIG. 3 showing the clamp locking member rotatably mounted to the upper clamp member of the clamp assembly.

Referring to FIGS. 3-10, the clamp assembly 12 includes an upper clamp member 18 that is coupled to a lower clamp member 20 via a hinge pin 22 located at a hinged end 25 of the clamp assembly 12 to form a clamshell hinge arrangement. Opposite the clamp assembly hinged end 25 is a non-hinged end 27. This configuration allows the two clamp members 18, 20 to be opened (as shown in FIGS. 8 and 9) to be placed on an elongated or tubular support member 13 and then to be closed (as shown in FIGS. 5-7) to be tightly clamped onto the support member 13. At the clamp assembly hinged end 25, the upper clamp member 18 includes a center projection 24 that projects downwardly and defines a slotted hole 29 for receiving the hinge pin 22. Also at the clamp assembly hinged end 25, the lower clamp member 20 includes two hinge arms 23a, 23b, each of which has an outer sleeve 26a, 26b that defines a corresponding sleeve hole 28a, 28b for closely receiving and holding the hinge pin 22. A flexible gripping pad 21 is disposed on the interior of each of the two clamp members 18, 20. Preferably, each of the gripping pads 21 is provided with a number of small grip protrusions molded into the pad to allow each of the clamp members 18, 20 to better grip the support member 13. A longitudinal threaded member 76 is fixed to and extends outwardly from an outwardly facing, generally flat surface 37 of the upper clamp member 18 so that the longitudinal threaded member 76 will not rotate with respect to the upper clamp member 18. In one preferred embodiment, for example, the inside surface of the upper clamp member 18 defines a 7 recess (not shown) that closely holds a hexagonal head of the longitudinal threaded member 76 so that it cannot rotate with respect to the upper clamp member 18.

To assemble the hinged end 25 of the clamp assembly 12, the upper and lower clamp members 18, 20 are positioned so that the lower clamp member sleeve holes 28a, 28b align with the upper clamp member slotted hole 29. The hinge pin 22 is then inserted so that it extends through the lower clamp member sleeve holes 28a, 28b and the upper clamp member slotted hole 29. The slotted hole 29 is oriented to allow the hinge pin 22 (and the lower clamp member 20 holding the hinge pin 22) to slide toward and away from the upper clamp member 18 while still maintaining a hinged relationship with the upper clamp member 18. In this configuration, the hinged joint of the clamp assembly 12 can be expanded to accommodate different size support members. In one presently preferred embodiment, the hinge pin 22 has a rectangular cross-section (as can be seen in FIGS. 5 and 8). In this configuration, when the clamp assembly 12 is an open position similar to that of FIG. 8, the hinge pin 22 can freely slide to any selected position along the length of the slotted hole 29. When the non-hinged end of the lower clamp member 20 is then rotated so that the clamp assembly 12 is placed in a fully closed position (such as the position shown in FIG. 5) about a support member 13, the hinge in 22 will also rotate so that it is wedged within the slotted hole 29 at the selected position and will not slide within the hole. In this way, hinge of the clamp assembly 12 can be expanded to accommodate a much larger variety of handle sizes and can be locked into this expanded position.

Still referring to FIGS. 3-10, at the clamp assembly non-hinged end 27, the upper clamp member 18 includes a yolk portion with opposing arms 30a, 30b, each of which has an outer sleeve 31a, 31b that defines an upper clamp member sleeve hole 32a, 32b. Each of these sleeve holes 32a, 32b is sized and shaped to receive an upper cross dowel nut 33, which has an elongated cylindrically shaped body with a threaded cross-hole 34 disposed generally perpendicular to the length of the nut body. Also at the non-hinged end 27, the lower clamp member 20 includes a corresponding yolk portion having opposing arms 35a, 35b, each of which is configured to engage a portion of the corresponding upper clamp member sleeve 31a, 31b when the clamp assembly is in the fully closed position (as shown in FIGS. 3 and 5-7).

Still referring to FIGS. 3-10, the clamp assembly 12 also includes a clamp locking member 80 for quickly clamp assembly 12 into and releasing it from the closed position. In the embodiment shown, the clamp locking member 80 comprises a generally U-shaped body wherein the base of the U-shape acts as a lever handle 82 and the arms of the "U" act as lever arms 84a, 84b, each of which terminates in a cam-shaped sleeve 85a, 85b that has a sleeve hole 86a, 86b. These sleeve holes 86a, 86b are aligned with each other and are sized and shaped to receive a lower cross-dowel nut 87 with a threaded cross-hole 88 and structure similar to the upper cross-dowel nut 33. When the clamp assembly 12 is fully assembled, the clamp locking member 80 is coupled to the upper clamp member 18 via a threaded shaft 90, the lower end of which extends through the threaded cross-hole 88 in the lower cross-dowel nut 87 and the upper end of which extends through the threaded cross-hole 34 in the upper cross-dowel nut 33. Each end of the threaded shaft 90 is capped by a threaded screw cap 92. As can be seen in FIG. 7, the lower clamp member arms 35a, 35b are configured to straddle the threaded shaft 90 when the clamp assembly 12 is closed, thereby allowing the clamp assembly 12 to be opened and closed without removing the clamp locking member 80.

In the foregoing configuration, the clamp locking member 80 acts as a quick lock/release lever, which can be used to secure the clamp assembly 12 of the mounting device 10 to elongated support members 13 of various sizes. To adjust the distance between the cam-shaped sleeves 85a, 85b and the upper clamp member 18 in the closed position (as shown in FIGS. 3 and 5-7), the user rotates the clamp locking member handle 82 away from the lower clamp member 20 to an unlocked position and then rotates the clamp locking member 80 on the threaded shaft 90 (see FIG. 10) in the appropriate direction to move the clamp locking member 80 towards or away from the upper clamp member 18, thereby adjusting the distance between the cam-shaped sleeves 85a, 85b and the upper clamp member 18. When this distance is properly adjusted for a given size elongated support member 13, the clamp assembly 12 can be placed over the support member with the upper and lower clamp members 18, 20 closed over the support member 13. The clamp assembly 12 can then be secured on the support member 13 by rotating the clamp locking member lever handle 82 toward the lower clamp member 20 into a locked position (like that shown in FIGS. 5-7). This rotation causes the cam-shaped sleeves 85a, 85b to rotate into engagement with the corresponding lower clamp member arms 35a, 35b and urges them toward the corresponding upper clamp member outer sleeve 31a, 31b. After the lever handle 82 has been rotated to the locked position, the shape of the cam-shaped sleeves 85a, 85b resists rotation of the lever handle 82 in the opposite direction, thereby locking the clamp assembly 12 into the fully closed position. To release the clamp locking member, a user simply rotates the lever handle 82 away from the lower clamp member 20, which allows the lower clamp member arms 35a, 35b to be disengaged from the upper clamp member outer sleeves 31a, 31b80 so that the clamp assembly 12 can be opened (as shown FIG. 8).

Umbrella Holder

Referring still to the embodiment shown in FIGS. 3 and 4, the umbrella holder 14 has a generally cylindrical housing 40 that includes an upper end portion 42 and a lower end portion 44 and defines an interior chamber 46 sized for receiving a handle of an umbrella (not shown). The housing lower end portion 44 includes a projection 45 that is configured to mate with and form a swivel joint with the coupler assembly 15 as described below.

The housing upper end portion 42 has an opening 48 to allow for insertion of the umbrella into the housing 40 and is adapted for attachment of a locking cap 50 that includes a slot 52 for accommodating the shaft of the umbrella. The locking cap 50 has projections 56, which project inwardly from the interior of the locking cap 50 and are physically configured to mate with outwardly projecting thread portions 54 on the exterior of the housing upper end 40 when the locking cap 50 is placed over the housing upper end portion 42 and twisted so that the cap projections 56 rotate into threaded engagement with the external projections 54 of the housing upper end portion 42. In this configuration, the locking cap 50 can be removably mounted to and locked into position on the housing upper end portion 42 by screwing the locking cap 50 onto the housing upper end portion 42. The locking cap 50 can be tethered to the housing 40 via a tether cord 41 to avoid misplacing the cap.

The housing lower end portion 44 includes a projection 45 that is configured for rotationally mounting the umbrella holder 14 to the coupler assembly 15 as described below. As can best be seen in FIG. 4, each of two opposing outer surfaces of the housing lower end projection has a series of radially oriented gripping protrusions 73 configured to mate with corresponding radially oriented grooves 81 on a the coupler assembly 15, as described in more detail below.

Coupler Assembly

Still referring to FIGS. 3 and 4, the coupler assembly 15 includes a clevis assembly 60 formed by two opposing clevis halves 62, 64, which are joined together with bolts 65 and nuts 67. When assembled, the clevis assembly 60 includes a shank base 66, an opposing yoke 68 having two opposing arms 69, 71 each of which has a through-hole for supporting a clevis pin 70 within the yoke 68 along the transverse rotation axis T. The shank base 66 defines a recess 72 for receiving and holding a hexagonal nut 74 such that the nut will not rotate with respect to the shank base 66. The shank base 66 is rotationally mounted to the longitudinal threaded member 76, which is disposed along the longitudinal rotation axis L (which is generally perpendicular to the transverse rotation axis T). The longitudinal threaded member 76 extends outwardly from the outwardly facing, generally flat surface 37 on the upper clamp member 18, which surface is generally parallel to the transverse rotation axis T. In this configuration, the shank base 66 is rotatable through an angle of 360 degrees about the longitudinal rotation axis with respect to the clamp assembly 12. As can best be seen in FIG. 4, on the inside of each of the clevis arm 69, 71 and disposed about the arm through hole is a series of radially oriented gripping protrusions 73 that mate with corresponding radially oriented grooves 81 on a corresponding side of the housing lower end projection 45.

Still referring to the embodiment shown in FIGS. 3 and 4, the coupler assembly also includes a longitudinal rotation locking mechanism 16 configured to secure the umbrella holder 14 at any selected angular position within the 360 degree range of longitudinal rotation. In this embodiment, the longitudinal rotation locking mechanism includes a longitudinal tightening handwheel 75 with an internal threaded nut 77 for receiving the longitudinal threaded member 76. With the clevis assembly 60 rotationally mounted on the upper end of the longitudinal threaded member 76 and the longitudinal tightening handwheel 75 rotationally mounted on the longitudinal threaded member 76 between the clevis assembly 60 and the upper clamp member 18, the clevis assembly 60 can be rotated into any angular position with respect to the longitudinal rotation axis L and can be secured in that angular position by rotationally tightening the longitudinal tightening handwheel 75 such that the tightening handwheel 75 snugly engages both the bottom of the clevis shank base 66 and the flat surface 37 on the upper clamp member 18.

In addition, the embodiment of the coupler assembly 15 shown in FIGS. 3 and 4 includes a transverse rotation locking mechanism 19 configured to tighten or loosen the clevis yoke 68 about the umbrella holder housing 40 and to secure the umbrella holder at an angular position about the transverse rotation axis T that is selectable from a plurality of angular positions about the transverse rotation axis. In this embodiment, the transverse rotation locking mechanism includes a transverse tightening handwheel 78 with an internal threaded nut 79 for receiving the threaded portion of the clevis pin 70. When the clevis assembly 60 is assembled with the yoke arms 69, 71 engaging the housing lower end projection 45 and the through holes of the yoke arms 69, 71 and projection 45 aligned, the umbrella holder housing 40 can be locked into a selected angular position with respect to the transverse rotation axis T by rotationally tightening the threaded handwheel 78 on the threaded portion of the clevis pin 70.

Having read this disclosure, it will also be understood by those having skill in the art that modifications may be made to the invention without departing from its spirit and scope. Therefore, the invention in its broader aspects is not limited to the specific details, representative devices, and illustrative examples shown and described. Accordingly, departures may be made from such details without departing from the spirit or scope of the general inventive concept.

What is claimed is:

1. An umbrella mounting device for removably mounting an umbrella to a generally tubular member, the assembly comprising:
    a clamp assembly configured to be removably clamped to the generally tubular member, wherein the clamp assembly includes an outwardly facing mounting surface that is disposed generally parallel to the clamp assembly axis, and
    an umbrella holder configured to receive an umbrella handle;
        wherein the umbrella holder is rotatably coupled to the clamp assembly mounting surface so that the umbrella holder can be rotated about a longitudinal rotation axis that is generally perpendicular to the clamp assembly axis; and
        wherein the umbrella holder is rotatable to one of a plurality of selectable positions about a transverse rotation axis, wherein the transverse rotation axis is generally parallel to the clamp assembly mounting surface and is generally perpendicular to the longitudinal rotation axis;
    a longitudinal rotation locking mechanism configured to secure the umbrella holder in the longitudinal rotation axis at an angular position that is selectable from a plurality of angular positions about the longitudinal rotation axis;
    a transverse locking mechanism configured to secure the umbrella holder into one of the plurality of selectable positions about the transverse rotation axis;
    wherein the longitudinal rotation locking mechanism includes a handwheel that is rotatably mounted on a threaded member disposed along the longitudinal rotation axis between the umbrella holder and the clamp assembly.

2. The umbrella mounting device of claim 1 wherein the umbrella holder includes a portion that is rotatably mounted within a clevis on a clevis pin disposed along the transverse rotation axis.

3. The umbrella mounting device of claim 2 wherein the transverse rotation locking mechanism includes a transverse rotation locking member rotatably mounted on a threaded portion of the clevis pin and configured to tighten or loosen the clevis about the umbrella holder when the transverse rotation locking member is rotated.

4. The umbrella mounting device of claim 3 wherein the transverse rotation locking member comprises a threaded handwheel.

5. The umbrella mounting device of claim 1 further comprising a clevis including a yoke and an opposing shank, wherein the clevis yoke supports a clevis pin, the umbrella holder is mounted to the clevis pin and the clevis shank is rotatably coupled to the clamp assembly.

6. The umbrella mounting device of claim 1 wherein the clamp assembly includes a first clamp member, an opposing second clamp member, and a closure member configured to loosen and tighten the first and second clamp members.

7. The umbrella mounting device of claim 6 wherein the first and second clamp members are configured in a clamshell arrangement.

8. The umbrella mounting device of claim 1 wherein the clamp assembly includes a quick release lever.

9. An umbrella mounting device for removably mounting an umbrella to an elongated member of a supporting frame or structure, the assembly comprising:
   a clamp assembly configured to be removably clamped to the elongated member, wherein the clamp assembly includes an outwardly facing mounting surface that is disposed generally parallel to the clamp assembly axis, and
   an umbrella holder coupled to the clamp assembly and configured to receive an umbrella handle;
      wherein the umbrella holder is rotatable about a longitudinal rotation axis that is generally perpendicular to the clamp assembly axis; and
      wherein the umbrella holder is also rotatable about a transverse rotation axis to one of a plurality of selectable positions, wherein the transverse rotation axis is generally parallel to the clamp assembly mounting surface and is generally perpendicular to the longitudinal rotation axis;
   a longitudinal rotation locking mechanism configured to selectively secure the umbrella holder at an angular position about the longitudinal rotation axis that is selectable from a plurality of angular positions about the longitudinal rotation axis;
      wherein the longitudinal rotation locking mechanism includes a longitudinal rotation locking member rotatably mounted on a threaded member that is disposed along the longitudinal rotation axis between the umbrella holder and the clamp assembly;
   a transverse rotation locking mechanism configured to selectively secure the umbrella holder at an angular position about the transverse rotation axis that is selectable from a plurality of angular positions about the transverse rotation axis into one of the plurality of selectable positions about the transverse rotation axis; and
   a clevis that includes a yoke supporting a clevis pin, wherein:
      the clevis yoke is rotatably coupled to the clamp assembly;
      the umbrella holder includes a portion rotatably mounted on the clevis pin within the clevis yoke;
      the clevis pin is disposed along the transverse rotation axis; and
      the transverse rotation locking mechanism includes a locking member configured to tighten or loosen the clevis about the umbrella holder.

10. The umbrella mounting device of claim 9 wherein the clamp assembly includes a quick release lever.

11. An umbrella mounting device for removably mounting an umbrella to an elongated support member, the assembly comprising:
   a clamp assembly configured to be removably clamped to the elongated support member, wherein the clamp assembly includes an outwardly facing mounting surface that is disposed generally parallel to the clamp assembly axis, and
   a coupling assembly comprising a clevis including a shank, an opposing yoke, and a pin supported within the yoke;
      wherein the clevis shank is rotationally mounted to a longitudinal threaded member that is coupled to the clamp assembly and is disposed along a longitudinal rotation axis that projects through and is generally perpendicular to the clamp assembly outwardly facing mounting surface, whereby the clevis shank is rotatable about the longitudinal rotation axis with respect to the clamp assembly; and
      wherein the clevis pin is disposed along a transverse rotation axis that is generally parallel to the clamp assembly mounting surface and is generally perpendicular to the longitudinal rotation axis;
   an umbrella holder configured to receive an umbrella portion, wherein the umbrella holder is mounted on the clevis pin and is rotatable about the transverse rotation axis;
   a transverse rotation locking member configured to tighten or loosen the clevis yoke about the umbrella holder and to secure the umbrella holder at an angular position about the transverse rotation axis that is selectable from a plurality of angular positions about the transverse rotation axis; and
   a longitudinal rotation locking member mounted on the clevis longitudinal threaded member between the umbrella holder and the clamp assembly and movable along the longitudinal threaded member between a secured position wherein the longitudinal rotation locking member restricts rotation of the umbrella holder about the longitudinal threaded member and an unsecured position wherein the longitudinal rotation locking member allows longitudinal rotation of the umbrella holder about the longitudinal threaded member.

12. The umbrella mounting device of claim 11 wherein the clamp assembly includes a quick release lever.

13. The umbrella mounting device of claim 11 wherein the transverse rotation locking member comprises a threaded handwheel.

14. The umbrella mounting device of claim 11 wherein the longitudinal rotation locking member comprises a threaded handwheel.

* * * * *